| United States Patent [19] | [11] | 4,211,557 |
|---|---|---|
| Sychev et al. | [45] | Jul. 8, 1980 |

[54] METHOD FOR PROCESSING LEAD STORAGE-BATTERY SCRAP

[76] Inventors: Anatoly P. Sychev, prospekt Lenina, 60, kv. 16; Georgy V. Kim, ulitsa Ushanova, 92, kv. 54; Valentin F. Larin, ulitsa Burova, 24, kv. 45; Galina D. Sidorova, prospekt Lenina, 19/1, kv. 52; Ivan G. Vikharev, ulitsa Belinskogo, 42, kv. 27; Vyacheslav P. Kuur, ulitsa Stakhanovskaya, 59, kv. 18, all of Vostochno-Kazakhstanskaya oblast, Ust-Kamenogorsk; Raul S. Akhmetov, Kurmangazy, 33, kv. 32, Alma-Ata; Georgy L. Moiseev, prospekt Lenina, 15, kv. 34, Leninogorsk; Vladimir I. Maslov, prospekt Gagarina, 38, kv. 66, Leninogorsk; Vladimir G. Kabachek, 3 Mikroraion, Leninogorsk; Igor M. Cherednik, prospekt Lenina, 60, kv. 36, Vostochno-Kazakhstanskaya oblast, Ust-Kamenogorsk, all of U.S.S.R.

[21] Appl. No.: 914,300

[22] Filed: Jun. 9, 1978

[51] Int. Cl.² .................................................. C22B 13/00
[52] U.S. Cl. ........................................... 75/77; 75/63; 75/65 R
[58] Field of Search ........................ 75/77, 445, 63, 65

[56] References Cited

U.S. PATENT DOCUMENTS 3,689,253  9/1972  Dorenfeld et al. ..................... 75/77

*Primary Examiner*—M. J. Andrews
*Attorney, Agent, or Firm*—Haseltine, Lake & Waters

[57] ABSTRACT

According to the method of the invention, the lead storage-battery scrap is first subjected to crushing, with large chlorine-containing lead metallic parts and chlorine-containing organic materials being separated therefrom. The remainder of the scrap is ground and then smelted in an oxidizing atmosphere at a temperature of from 1300° to 1500° C. until an oxidizing melt is obtained whereupon the lead oxide contained therein is reduced to metallic lead.

3 Claims, No Drawings

METHOD FOR PROCESSING LEAD STORAGE-BATTERY SCRAP

BACKGROUND OF THE INVENTION

1. Field of the Application

The present invention relates to the production of secondary lead, and more particularly, to a method of processing scrap storage batteries formerly used in automobiles.

The invention can find most utility in the pyrometallurgical practice of lead smelting.

2. Description of the Prior Art

It is common practice to separate used storage batteries (after two or three years of service life) into parts which contain large-size lumps of metallic lead, such as bridge-poles, gridplates, contact pintles, etc., into the parts containing sulphate-oxide active mass of electrodes; into the cases formed of organic materials, such as ebonite, pitch, polyethylene, etc., and into chlorine-containing organic substances. The separation of storage batteries is carried out either manually or by resorting to sowing and grinding operations. After the chlorine-containing organic substances are separated, the parts of battery scrap containing lead or its compounds are subjected to smelting.

The above-described method is ineffective and labor-consuming, since during dry separation of scrap the cases of such batteries undergo sowing, which can be either a manual or a mechanized operation, whereupon the contents are removed, dried, the polyvinyl-chloride separators being disengaged by air separation, while antimonial lead and the active mass of electrodes are recovered from the residual mass.

FRG Pat. No. 1,533,129 describes a wet method of processing battery scrap which comprises the steps of crushing said scrap and its subsequent screening on two vibrating screens as it is concurrently sprayed with water.

The first of two screens is provided with a net formed with apertures of 60 to 80 mm in size, the second screen having a net with apertures of 3 to 5 mm in size. The product on top of the first screen are separators from elastic polyvinyl-chloride, not easily crushed in crushing machines by reason of their elasticity. After several additional operations the residual lead is collected from these separators which are then discarded to waste.

The undersize of the first screen, freed from the bulk mass of separators, is basically the sulphate-oxide part of the active mass of electrodes, crushed metallic lead and the cases formed of organic substances. The undersize in question is fed to the second screen with the size of net apertures thereof ranging from 3 to 5 mm, where it is classified into two size fractions. Small-size fractions (active mass of electrodes and, partially, lead and organic substances) are recovered as the finished product, whereas large-size fractions are delivered to a wheel separator into a heavy magnetic suspension where it is classified according to specific gravity into light fraction (fragments of cases) and heavy fraction (metallic lead). Thereafter, both products are washed out on two screens from the residual suspension and are then fed to the end-product bins; the suspension being passed to the magnetic separator for regeneration.

The above-described method, however, is comparatively expensive and difficult to be carried into effect.

For example, the cases formed of organic substances are discarded to waste, since they tend to burn when they get into the melt of a melting apparatus heated to 1000° C., giving off carbon black and tar matter; causing the exhaust of gas from the melting apparatus, complicating the operation of dustcatchers and polluting the atmosphere with noxious gases. The weight of cases is from 20 to 25 percent by weight of the battery scrap.

It should be observed that up to 3 percent of lead is lost with the discarded cases. The material of the separators, containing organic substances and chlorine, constitutes only 2 percent of the total weight of the battery scrap. The material in question is discarded to waste because chlorine tends to form lead chlorides in the course of smelting. The recovery of lead from these chlorides presents great technological difficulties. Moreover, the presence of chlorine brings about vigorous corrosion of gas- and dust collecting systems. It is common practice to carry out the pyrometallurgical processing of separated battery scrap in shaft furnaces jointly with sinter obtained from crudes, or else said scrap can be used as an additive to the charge of ore fed thereto at the stage of sintering, accompanied by the reduction smelting of the sinter in the shaft furnace.

There is also known preliminary sintering of battery scrap followed by subsequent smelting thereof in the shaft furnace.

However, the method of treating battery scrap in shaft furnaces invariably leads to substantial loss in lead, as well as to an appreciable consumption of coke.

Polish Pat. No. 54,183 teaches a method of processing battery scrap, which is in a way advantageous over the methods described herein above. According to this method, the operating process is effected in the presence of a reducing agent and soda ash ($Na_2CO_3$). The reaction proceeds as follows:

$$PbSO_4 + 2C = PbS + 2CO_2$$

$$PbS + Na_2CO_3 + CO = Pb + Na_2S + 2CO_2$$

Since lead sulphate is the hardest part of the battery scrap to yield to treatment, it is therefore this part that dictates the operating technique to be applied.

The process is carried out in drum-type furnaces or electric furnaces at a temperature ranging from 900 to 1100° C.

However, the method of the patent referred to above requires considerable consumption of a reducing agent, such as coal or coke, an appreciable input of power (fuel or electric power) needed for setting up a working temperature, as well as the consumption of a comparatively large amount of scarce soda ash ($Na_2CO_3$).

Another serious disadvantage of the above-described method lies in a low degree of decomposition of lead sulphate, which does not exceed 28 percent.

The principal consumption of lead (about 40 percent) is as the metal and peroxide in storage batteries used mainly for the automobile industry. In view of the fact that the service life of storage batteries is not more than two or three years, the amount of secondary lead in need of processing increases with every year. Hence arises the necessity for an economically profitable and effective method of processing storage battery lead scrap, with a maximum utilization of its constituent parts.

SUMMARY OF THE INVENTION

The principal object of the invention is to provide a method for treating lead storage-battery scrap, which will permit initial material to be effectively treated and the yield of the finished product to be raised as compared to the known method used for similar purposes.

Another important object of the invention is to reduce the consumption of expensive fluxing materials utilized in the process of treatment of the initial material.

Still another no less important object of the invention is to reduce the consumption of power used in the course of treatment of battery scrap.

Yet another object of the invention is to improve working and health conditions for service personnel by preventing pollution of the environment while carrying out the proposed method.

These and other objects and features of the invention are accomplished by the provision of a method for processing lead storage-battery scrap, comprising the steps of crushing said scrap, separating large-size metallic lead parts and materials formed of chlorine containing organic substances from the sulphate-oxide part of said scrap containing lead compounds, and from the storage-battery cases formed of organic substances free from chlorine, subsequent smelting and reducing the lead compounds to metallic lead, and also subjecting to melting large-size lead metallic parts, wherein, according to the invention, prior to smelting, said sulphate-oxide part of the scrap and the storage-battery cases undergo grinding to be thereafter jointly smelted in an oxidizing atmosphere at a temperature of 1300° to 1500° C. until an oxidizing melt is obtained whereupon lead oxide is reduced to metallic lead.

The crushing of scrap makes it possible to carry out further mechanized separation thereof into parts.

The separation of the lead metallic parts makes it possible to avoid lead losses in the process of heating the remainder of the scrap, and to preserve its high-quality composition as to the content of antimony therein.

The grinding of the sulphate-oxide part of the storage-battery scrap and of the battery cases formed of organic materials free from chlorine permits the rate of smelting of the first part and burning of the second part to be stepped up. This enhances the efficiency of the process and creates the possibility for effecting flash smelting, makes it possible to intensify the process of heating and subsequent decomposition of the sulphate-oxide part of the storage-battery scrap.

The above-indicated range of temperatures at which the process of smelting proceeds permits the intensive and effective transition of lead sulphates into lead oxide.

The presence of an oxidizing atmosphere allows for efficient burning of materials formed of organic substances, for example, the storage-battery cases.

Lead oxide contained in the resultant oxidizing melt can be easily reduced to metallic lead. In addition, the melt and slag formed in the process of smelting can be used for melting large-size metallic lead parts of the battery scrap.

The scrap material is preferably ground prior to smelting to a size of minus 10 mm.

This will enable a rapid rate of heating a charge, vigorous burning of the parts formed of organic substances, as well as intensive decomposition and smelting of the sulphate-oxide part of the battery scrap.

The finely ground part of the battery scrap is preferably subjected to flash smelting.

This will permit heat exchange and mass exchange to be intensified in the process of smelting.

The temperature of the smelting process is preferably maintained within a requisite range by burning the ground cases of scrap batteries formed of organic substances free from chlorine, thereby reducing consumption of fuel used in the process of smelting.

As a result, the consumption of fuel or electric power required to enable efficient smelting is substantially decreased.

The oxidizing atmosphere necessary for the process of smelting is provided by preferable utilization of oxygen and/or air.

This will intensify the process of burning of the battery cases formed of organic substances free from chlorine, whereby the process of decomposition of lead sulphate will be stepped up and the amount of effluent gases will be reduced.

It is advantageous that large-size metallic lead parts separated after the crushing operation be melted in the oxidizing melt resultant from the smelting of the finely crushed part of the storage-battery scrap.

This will allow the melting of metallic lead to be effected in the oxidizing melt formed in the process of smelting of the finely crushed portion of the battery scrap.

DETAILED DESCRIPTION OF THE INVENTION

The invention will be further described with reference to illustrative Examples and Test Results.

Scrap batteries are initially crushed to facilitate the separation of large-size lead metallic parts, such as contact pintles, bridge-poles and gridplates, as well as materials (separators) formed of chlorine containing organic substances. The remainder sulphate-oxide part of the scrap containing lead compounds is ground jointly with the battery cases formed of organic substances free from chlorine to a size of minus 10 mm. Next, the ground battery scrap is subjected to smelting run at a temperature of 1300° to 1500° C. in an oxidizing atmosphere until an oxidizing melt is obtained which contains lead oxide. Since the crushed scrap material contains not less than 10 percent by weight of combustible materials, such as chlorine-free organic substances, their burning in an oxidizing atmosphere is accompanied by the liberation of heat used for the smelting of sulphate-oxide compounds of lead. Air or oxygen are normally used to create an oxidizing atmosphere, though a mixture thereof is likewise suitable for the purpose. In the process of smelting, lead sulphate is decomposed, the reaction proceeding as follows: $PbSO_4 \rightarrow PbO + SO_3$. The decomposition of lead sulphate is effected at a rapid rate and practically completely (more than 90 percent). Lead oxides together with undecomposed residual lead sulphate and other constituents of the battery scrap, such as silicate cotton, form at a given temperature a fluid melt which contains lead oxide. Next, lead oxide is reduced to metallic lead, for example, under the effect of carbon.

The large-size lead metallic parts separated after the crushing of scrap batteries may be melted separately or in an oxidizing melt resultant from the smelting of the ground portion of scrap. By grinding the parts of the battery scrap, it becomes possible to conduct flash smelting thereof.

The requisite temperature for smelting the sulphate-oxide portion of the scrap is achieved by burning the finely ground battery cases formed of organic substances free from chlorine. Such utilization of the battery cases allows autogeneous smelting to be carried out, thereby substantially reducing the consumption of fuel, such as carbon-containing dust, natural gas or liquid fuel. Combustion gases contain gaseous oxides which present no difficulty during cleaning of technological gases.

EXAMPLE 1

Storage battery scrap was crushed, materials formed of chlorine-containing organic substances and large-size metallic lead parts were separated therefrom and the remaining part was ground to a size of minus 10 mm. The composition of the residue was (in % by weight); lead 72.3; sulphate sulphur - 6.2; storage battery cases - 10, impurities-the balance. The smelting of the finely ground material thereafter carried out in the air under laboratory conditions for a period of 4 min. and at a temperature of 1500° C. After reducing lead oxide to metallic lead by the use of carbon, the recovery of said metallic lead was as high as 92 percent (without taking into account sublimates obtained during smelting).

EXAMPLE 2

In accordance with the method of the invention the storage-battery scrap was crushed, the injurious constituents were removed therefrom, and large-size lead metallic parts were separated out. The remainder was ground to a size of minus 5 mm. The scrap in question contained, in percent by weight: lead, 66.7; sulphate sulphur, 6.3; battery cases formed of organic substances, 15.

The smelting was carried out in the flame zone with simultaneous supply of oxygen and at a temperature of 1320° C. without consuming fuel usually employed in the process of smelting, since the smelting temperature was maintained within a preset range by burning crushed battery cases formed of organic substances free from chlorine. Technical-grade oxygen including 92% $O_2$, used to set up an oxidizing atmosphere, was supplied at the flow rate of 260 $Nm^3/hr$, and at the production rate of 1000 kg/hr in terms of starting material. The preseparated large-size lead metallic parts underwent melting in the oxidizing melt resultant from the smelting of the finely ground portion of the battery scrap. The reduction of lead oxide to metallic lead was effected by using coke-breeze charged on the surface of the bath in an electric furnace at the rate of 30 kg per hour.

Upon completion of the lead oxide reduction to metallic lead, the loss of lead carried out with waste slag was only 0.18 percent by weight of the total quantity of lead contained in the processed scrap.

EXAMPLE 3

Storage battery scrap was crushed and separated from materials formed of chlorine-containing substances and from large-size metallic lead parts. The remaining part was comminuted to a size of minus 2 mm. This part of the storage battery scrap contained in % by weight: lead-66.5, sulphate sulphur-6.2 and battery cases-15.

After being ground to a size of minus 2 mm, the scrap material underwent smelting in the flame zone as the air-oxygen mixture was concurrently fed to set up an oxidizing atmosphere. In the course of smelting an oxidizing melt was formed which contained lead oxide and having slag on its surface. Large-size metallic lead parts separated from the battery scrap prior to its grinding were fed to the oxidizing melt. To enable reduction of lead oxide to metallic lead, coke was fed onto the surface of the melt. The reduction was conducted in the electrothermic furnace. The production rate, in terms of starting material, was 1000 kg per hour, the consumption of coke used in the electric furnace to produce a reducing reaction was 30 kg per hour, and the flow rate of technical-grade oxygen (containing 92% $O_2$) was 260 $Nm^3/Hr$.

The smelting was thus carried out in an autogeneous manner, i.e. without the use of fuel, with the temperature in the working space of the furnace being 1360° C.

After lead oxide was reduced to metallic lead, the loss of lead discarded with waste slag was only 0.15 percent by weight of the total quantity of lead contained in the processed scrap.

What is claimed is:

1. A method for reprocessing lead storage-battery scrap, comprising: crushing said scrap; separating large-size metallic lead parts from said crushed scrap; separating chlorine-containing organic substances from said crushed scrap; grinding sulphate-oxide portion of said scrap, containing lead compounds, and battery cases formed of organic substances free from chlorine; subjecting the finely ground part of the scrap to smelting in an oxidizing atmosphere at a temperature of 1300° to 1500° C. until an oxidizing melt having a slag layer is obtained which contains lead oxide; reducing said lead oxide to metallic lead; and melting said large-size metallic lead parts separated after crushing separately or under the layer of slag in the oxidizing melt resultant from the smelting of the finely ground portion of the storage battery scrap.

2. A method as claimed in claim 1, wherein the storage-battery scrap is subjected after grinding to flash smelting.

3. A method as claimed in claim 1, wherein said large-size lead metallic parts separated after crushing are melted under the layer of slag in the oxidizing melt resultant from the smelting of the finely crushed portion of the storage-battery scrap.

* * * * *